United States Patent
Luo et al.

(10) Patent No.: US 8,548,383 B2
(45) Date of Patent: Oct. 1, 2013

(54) POWER SPECTRUM DENSITY CONTROL FOR WIRELESS COMMUNICATIONS

(75) Inventors: Xiliang Luo, San Diego, CA (US); Rashid Ahmed Akbar Attar, San Diego, CA (US); Christopher Gerard Lott, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 981 days.

(21) Appl. No.: 12/548,288

(22) Filed: Aug. 26, 2009

(65) Prior Publication Data

US 2010/0056061 A1 Mar. 4, 2010

Related U.S. Application Data

(60) Provisional application No. 61/092,185, filed on Aug. 27, 2008.

(51) Int. Cl.
*H04B 1/00* (2006.01)
*H04B 15/00* (2006.01)

(52) U.S. Cl.
USPC ....... 455/63.1; 455/522; 455/501; 455/452.2; 455/135; 455/67.13; 370/318; 375/240.27

(58) Field of Classification Search
USPC .......... 455/63.1, 500, 522, 501, 452.2, 161.3, 455/135, 67.13, 69, 13.4; 370/318; 375/240, 375/27
See application file for complete search history.

(56) References Cited

U.S. PATENT DOCUMENTS

| | | | |
|---|---|---|---|
| 6,289,217 B1 | 9/2001 | Hamalainen et al. | |
| 6,690,939 B1 | 2/2004 | Jonsson et al. | |
| 7,266,385 B2 | 9/2007 | Koo et al. | |
| 8,050,701 B2 * | 11/2011 | Gorokhov et al. | 455/522 |
| 8,073,481 B2 | 12/2011 | Luo et al. | |
| 8,155,685 B2 * | 4/2012 | Lim et al. | 455/522 |

(Continued)

FOREIGN PATENT DOCUMENTS

| | | |
|---|---|---|
| EP | 1276233 A2 | 1/2003 |
| JP | 9275373 A | 10/1997 |

(Continued)

OTHER PUBLICATIONS

Search Report and Written Opinion—PCT/US2009/055203-International Search Authority-European Patent Office, Dec. 22, 2009.
3GPP TR 25.814 V7.1.0 (Sep. 2006), 3rd Generation Partnership Project; Technical Specification Group Radio Access Network; Physical layer aspects for evolved Universal Terrestrial Radio Access (UTRA) (Release 7).

(Continued)

*Primary Examiner* — Shaima Q Aminzay
(74) *Attorney, Agent, or Firm* — Linda G. Gunderson

(57) ABSTRACT

Systems and methodologies are described that facilitate adjusting power spectrum density (PSD) for wireless devices according to multiple possible step sizes. A step size for an adjustment can be selected based at least in part on a received overload indicator from one or more access points, a PSD required to achieve a target signal-to-interference-and-noise ratio (SINR) for a wireless device, and a PSD previously assigned to the wireless device. Once the step size is selected, it can be applied to the previous PSD to generate a new PSD for the wireless device, and the wireless device can accordingly adjust PSD to mitigate inter-cell interference with the one or more access points.

29 Claims, 10 Drawing Sheets

(56) References Cited

U.S. PATENT DOCUMENTS

| | | | |
|---|---|---|---|
| 2003/0003921 | A1 | 1/2003 | Laakso |
| 2004/0047324 | A1 | 3/2004 | Diener |
| 2004/0095907 | A1 | 5/2004 | Agee et al. |
| 2004/0166835 | A1 | 8/2004 | Johansson et al. |
| 2006/0217141 | A1 | 9/2006 | Legg et al. |
| 2007/0041429 | A1* | 2/2007 | Khandekar ............. 375/146 |
| 2007/0147328 | A1 | 6/2007 | Carlsson et al. |
| 2007/0197360 | A1 | 8/2007 | Rester et al. |
| 2008/0107161 | A1 | 5/2008 | Xu et al. |
| 2008/0153535 | A1* | 6/2008 | Gorokhov et al. ............. 455/522 |
| 2008/0175185 | A1* | 7/2008 | Ji et al. ............. 370/318 |
| 2008/0220806 | A1* | 9/2008 | Shin et al. ............. 455/522 |
| 2008/0254804 | A1 | 10/2008 | Lohr et al. |
| 2008/0279257 | A1 | 11/2008 | Vujcic et al. |
| 2010/0182903 | A1 | 7/2010 | Palanki et al. |

FOREIGN PATENT DOCUMENTS

| | | |
|---|---|---|
| JP | 2008503925 | 2/2008 |
| KR | 20080074673 A | 8/2008 |
| RU | 2251800 | 5/2005 |
| WO | WO2008048894 | 4/2008 |
| WO | 2008055247 A1 | 5/2008 |
| WO | 2008057971 | 5/2008 |
| WO | WO2008097000 A1 | 8/2008 |

OTHER PUBLICATIONS

3GPP TS 36.300 V9.0.0 (Jun. 2009), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9).

3GPP TR 25.814 V 7.0.0: "Physical Layer Aspects for Evolved UTRA" (Jun. 2006).

3GPP TR 25.814 V7.1.0 (Sep. 2006) 3rd Generation Partnership Project; Technical Specification Group Radio Access Network; Physical layer aspects for evolved Universal Terrestrial Radio Access (UTRA) (Release 7), 3GPP-Standards, 2500 Wilson Boulevard, Suite 300, Arlington, Virginia 22201 USA, Sep. 1, 2006, XP040282759 see 9.3.2.4 (p. 100) t o 9.3.3.1 (p. 102).

Qualcomm Europe, System Analysis for UL SIMO SC-FDMA, 3GPP TSG-RAN WG1 LTE 45, May 8, 2006-May 12, 2006, Shanghai, China R- 061525.

Taiwan Search Report—TW098128843—TIPO—Sep. 20, 2012.

Transmission Power Control in E-UTRA Uplink, 3GPP TSG RAN WG1 Meeting #47bis, Jan. 2007, http://www.3gpp.org/ftp/tsg_ran/WG1_RL1/TSGR1_47bis/Docs/R1-070108.zip.

* cited by examiner

POWER SPECTRUM DENSITY CONTROL FOR WIRELESS COMMUNICATIONS

CROSS-REFERENCE

This application claims the benefit of U.S. Provisional Application Ser. No. 61/092,185, filed Aug. 27, 2008, and entitled "POWER SPECTRUM DENSITY (PSD) CONTROL FOR WIRELESS COMMUNICATIONS," the entirety of which is incorporated herein by reference.

BACKGROUND

I. Field

The present disclosure relates generally to wireless communications and more specifically to power control for devices communicating in a wireless network.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), etc.

Generally, wireless multiple-access communication systems may simultaneously support communication for multiple mobile devices. Each mobile device may communicate with one or more access points (e.g., base stations, femtocells, picocells, relay nodes, and/or the like) via transmissions on forward and reverse links. The forward link (or downlink) refers to the communication link from access points to mobile devices, and the reverse link (or uplink) refers to the communication link from mobile devices to access points. Further, communications between mobile devices and access points may be established via single-input single-output (SISO) systems, multiple-input single-output (MISO) systems, multiple-input multiple-output (MIMO) systems, and so forth. In addition, mobile devices can communicate with other mobile devices (and/or access points with other access points) in peer-to-peer wireless network configurations.

In addition, access points can provide one or more cells that represent a coverage area for one or more antennas of the access points. Cells of disparate access points can be substantially adjacent or overlapping to provide optimal coverage for the mobile devices. In this regard, however, mobile devices communicating in a cell can interfere with communications within another cell. Thus, transmission power of mobile devices can be controlled by an access point to mitigate or decrease the likelihood of such inter-cell interference. A serving access point can determine one or more mobile devices that potentially interfere with disparate access points based on downlink pathloss reports received from the mobile devices. For example, the mobile devices can measure downlink pathloss related to surrounding access points, and the serving access point can determine a potential for inter-cell interference based on comparing the reported pathlosses to a threshold that indicates the mobile device is near the surrounding access point.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

In accordance with one or more embodiments and corresponding disclosure thereof, various aspects are described in connection with facilitating adaptively adjusting mobile device transmission power using multiple step sizes. For example, an access point can receive overloading indicators from surrounding access points and determine whether one or more mobile devices are interfering beyond a threshold based at least in part on the overloading indicators. If so, a power spectrum density (PSD) for the one or more mobile devices can be decreased by a step size. The step size, in this example, can be selected based at least in part on comparing a target signal-to-interference-and-noise ratio (SINR) to a PSD required to achieve the target SINR. Similarly, if the overloading indicators specify that interference is not above the threshold, PSD can be increased for one or more mobile devices using a step size selected based at least in part on a PSD required to achieve a target SINR.

According to related aspects, a method is provided that includes receiving an overload indicator from one or more surrounding access points and receiving a target SINR related to one or more mobile devices. The method also includes selecting a PSD step size based at least in part on the overload indicator and the target SINR and applying the PSD step size to a previous PSD related to the one or more mobile devices.

Another aspect relates to a wireless communications apparatus. The wireless communications apparatus can include at least one processor configured to receive an overload indicator from one or more access points and compute a PSD to achieve a target SINR related to one or more mobile devices. The at least one processor is further configured to select a PSD step size based at least in part on the overload indicator and comparing the PSD to a previous PSD assigned to the one or more mobile devices and apply the PSD step size to the previous PSD to create a new PSD for the one or more mobile devices. The wireless communications apparatus also comprises a memory coupled to the at least one processor.

Yet another aspect relates to an apparatus. The apparatus includes means for receiving an overload indicator related to an access point and means for receiving a target SINR of a mobile device. The apparatus further includes means for selecting a PSD step size based at least in part on the overload indicator and the target SINR and means for applying the PSD step size to a previous PSD for the mobile device to create a new PSD for the mobile device.

Still another aspect relates to a computer program product, which can have a computer-readable medium including code for causing at least one computer to receive an overload indicator from one or more surrounding access points and code for causing the at least one computer to receive a SINR related to one or more mobile devices. The computer-readable medium can also comprise code for causing the at least one computer to select a PSD step size based at least in part on the overload indicator and the target SINR and code for causing the at least one computer to apply the PSD step size to a previous PSD related to the one or more mobile devices.

Moreover, an additional aspect relates to an apparatus including an overload determining component that receives an overload indicator related to an access point and a SINR receiving component that receives a target SINR of a mobile device. The apparatus can further include a PSD step size selecting component that determines a PSD step size based at least in part on the overload indicator and the target SINR and a PSD step size applying component that creates a new PSD for the mobile device by applying the PSD step size to a previous PSD for the mobile device.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed, and the described embodiments are intended to include all such aspects and their equivalents.

DETAILED DESCRIPTION

Figure 1:
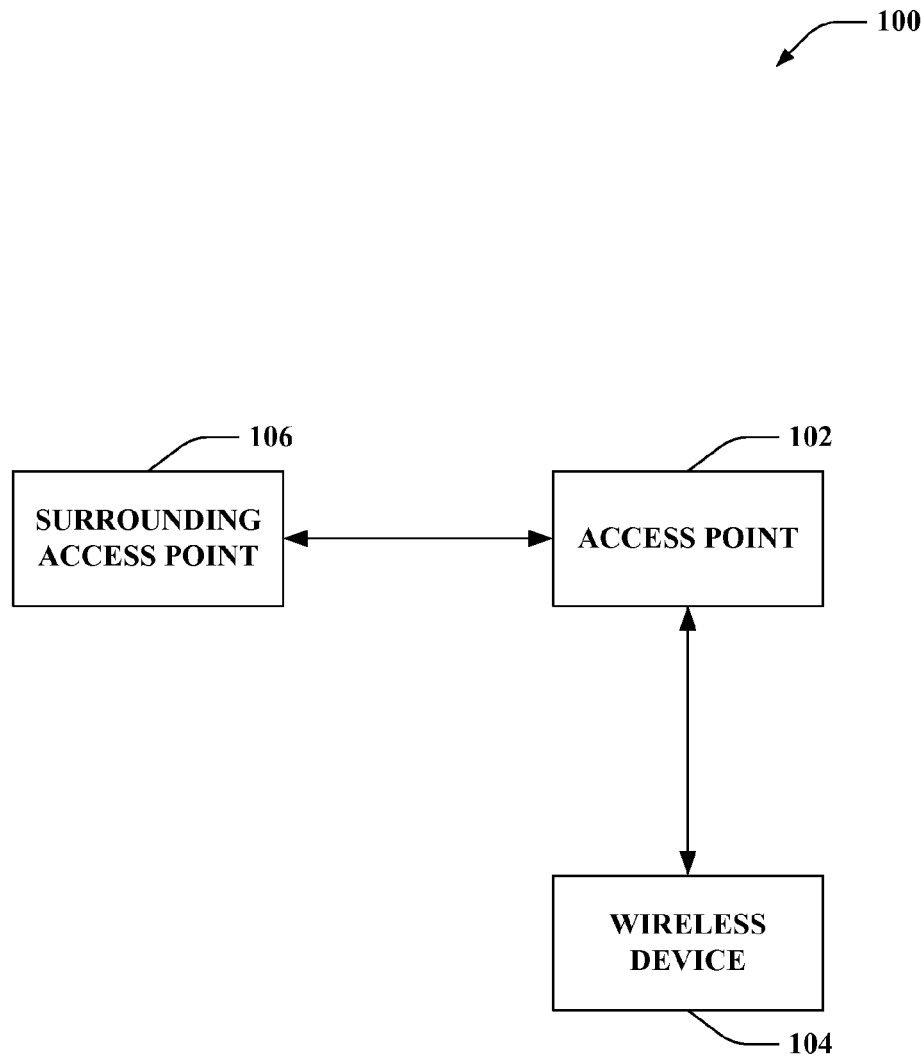
FIG. 1 is a block diagram of a system for adjusting power spectrum density (PSD) for wireless devices to avoid intercell interference.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Evolved Node B (eNB)) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 illustrates an example wireless network 100 that facilitates controlling device power spectrum density to mitigate inter-cell interference. An access point 102 is provided that communicates with a wireless device 104 to provide wireless network access thereto. Access point 102 can be a macrocell access point, femtocell or picocell access point, disparate wireless device, portions thereof, or substantially any device that provides access to a wireless network. In addition, wireless device 104 can be a mobile device, portion thereof, or substantially any device that receives access to a wireless network. In addition, access point 102 can communicate with surrounding access point 106 to receive overloading indicators related to inter-cell interference.

According to an example, wireless device 104 can communicate with access point 102 using a wireless communication technology, such as OFDM. In this regard, wireless device 104 can adjust power spectrum density (PSD), which refers to a power utilized to transmit one or more OFDM tones. In one example, wireless device 104 can adjust the PSD for a given resource assignment based on information received from access point 102 within or related to the resource assignment. Access point 102 can specify PSD or one or more related parameters to the wireless device 104 based on receiving information regarding possible inter-cell interference. In one example, surrounding access point 106 can communicate overload indicators to the access point 102 that relate to whether an interference-over-thermal (IoT) level at the surrounding access point 106 exceeds a threshold. Based at least in part on the overload indicators from surrounding access point 106 (and/or one or more surrounding access points), access point 102 can determine a PSD level for wireless device 104.

In one example, access point 102 can determine a target signal-to-interference-and-noise ratio (SINR) for the wireless device 104. The target SINR can be determined based on acquired information related to the wireless device 104 (e.g., channel quality indicators (CQI) received over a control channel, location or geometry received from the device, and/or the like). For example, the target SINR can be selected according to the parameters and a selection process. The selection process can be substantially any process for selecting target SINRs, for example devices of high geometry or in close proximity can be accorded higher target SINR than other devices. The selection process can be tuned to allow for fair treatment of devices based on geometry, location, etc., increased throughput for some devices or increased overall system throughput, and/or the like. In addition, based on the target SINR for the wireless device 104, access point 102 can compute a PSD needed to achieve the target SINR for a given resource assignment. This, for example, can be based on frequencies in the resource assignment, time slots in the resource assignment, and/or the like.

Based on the overload indicators, required PSD to achieve the target SINR, and a previous PSD, access point 102 can select a step size for PSD related to a resource assignment for the wireless device 104. For example, where an overload indicator from surrounding access point 106 indicates that IoT level is beyond a threshold, access point 102 can decrease the PSD for wireless device 104. If the previous PSD is not greater than that required to achieve the target SINR, access point 102 can select a small step size by which to decrease the PSD (e.g., 0.4 dB). If the PSD is greater than that required to achieve the target SINR, access point 102 can select a larger step size by which to decrease the PSD (e.g., 0.8 dB). Access point 102 can transmit a PSD decrease command along with the PSD computed by decreasing the previous PSD by the step size when providing the resource assignment to the wireless device 104, for example. It is to be appreciated that, as utilized herein, greater than can additionally or alternatively mean substantially greater than, greater than or equal to, and/or the like. Similarly, less than can additionally or alternatively mean substantially less than, less than or equal to, and/or the like.

Where an overload indicator from surrounding access point 106 indicates that IoT level is not beyond the threshold level that indicates inter-cell interference, access point can increase the PSD for the wireless device 104. If the previous PSD is greater than that required to achieve the target SINR, access point 102 can select a small step size by which to increase the PSD (e.g., 0.4 dB). If, however, the previous PSD is not greater than that required to achieve the target SINR, access point 102 can select a large step size by which to increase the PSD (e.g., 0.8 dB). Access point 102 can transmit a PSD increase command to the wireless device 104 along with the PSD computed by adding the step size to the previous PSD when providing the resource assignment or otherwise, for example. In this regard, adaptive PSD level adjustment for wireless device 104 is provided. It is to be appreciated that different and/or additional step sizes can be utilized; in one example, the step size can be the difference between the previous PSD and that required to achieve the target SINR. In addition, the access point 102 can first determine that wireless device 104 potentially interferes with surrounding access point 106 based on a downlink pathloss report from the wireless device 104 (e.g., where reported pathloss related to the surrounding access point 106 is below a threshold level indicating close proximity therewith).

Figure 2:
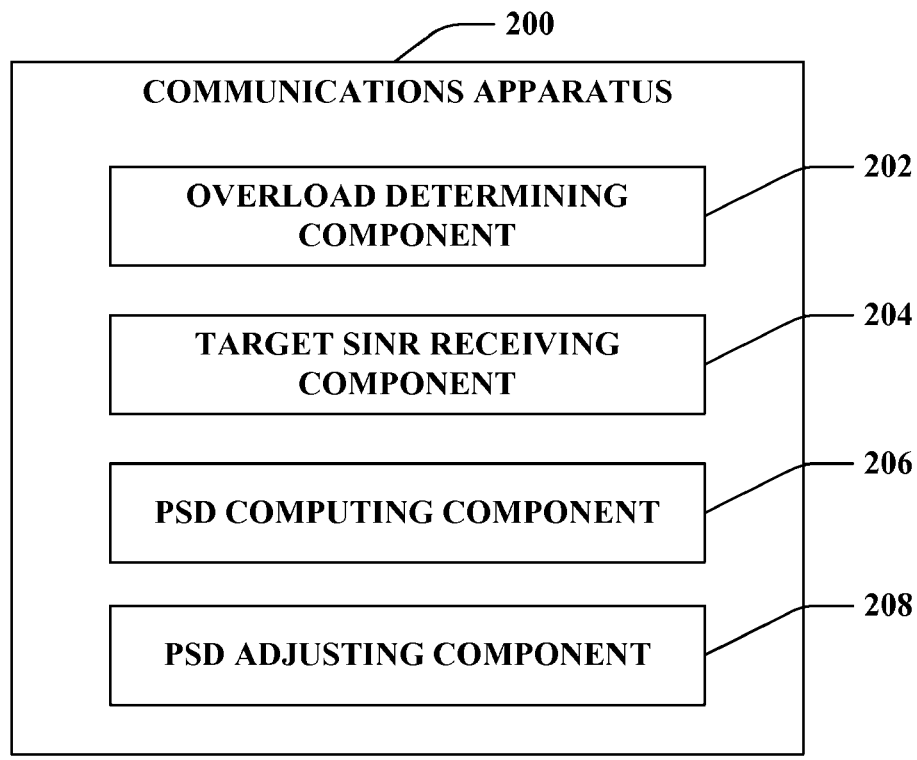
FIG. 2 is an illustration of an example communications apparatus for employment within a wireless communications environment.

Referring next to FIG. 2, a communications apparatus 200 that can participate in a wireless communications network is illustrated. The communications apparatus 200 can be an access point, a portion thereof, or substantially any device that can assign resources for communicating in a wireless network, such as a mobile device in a peer-to-peer configuration, mobile base station, relay node, and/or the like. The communications apparatus 200 can include an overload determining component 202 that can discern whether one or more access points are overloaded with interference, a target SINR receiving component 204 that can obtain a target SINR for one or more devices communicating with the communications apparatus 200, a PSD computing component 206 that can determine a PSD needed to achieve the target SINR for the one or more devices, and a PSD adjusting component 208 that can transmit a PSD modification command (e.g., in a resource assignment) to the one or more devices to mitigate interference to the one or more access points.

According to an example, overload determining component 202 can receive information regarding interference to surrounding access points (not shown). For instance, the information can be received from the surrounding access points over a wired or wireless backhaul link, from one or more core network components (not shown), from one or more devices (not shown) communicating with the surrounding access points, and/or the like. The information can relate to one or more overloading indicators that specify whether IoT at a given surrounding access point is above a threshold. Based at least in part on this information, overload determining component 202 can discern whether one or more surrounding access points are interfered by one or more devices connected to the communications apparatus 200 to receive wireless network access. Target SINR receiving component 204 can determine a target SINR for one or more devices communicating with the communications apparatus 200. This can be determined based on information received by the one or more devices, such as device geometry, location, and/or the like, determined based on information observed from the one or more devices, such as signal strength, and/or the like, as previously described.

In addition, PSD computing component 206 can determine a PSD needed to achieve the target SINR for resources to be scheduled to the one or more devices. This can be computed based on frequencies of the scheduled resources, time slots of scheduled resources, and/or the like. For example, different frequencies can require greater or different power to be received at a given SINR based on the nature of the frequency spectrum, devices utilizing the frequency space, and/or the like. PSD adjusting component 208 can determine a step size to apply to a previous PSD based on the overloading determination and the PSD needed to achieve the target SINR. As described, the PSD adjusting component 208 can select from multiple step sizes, such as a small or larger size based on a difference between the PSD needed for the target SINR and a previous PSD. In another example, PSD adjusting component 208 can utilize a step size that sets the previous PSD to that required to attain the target SINR. In one example, this step size can be utilized when access points are not overloaded, and the previous PSD is less than that required to meet the target SINR. In another example, this step size can be utilized when access points are overloaded, and the previous PSD is greater than that required to meet the target SINR. PSD adjusting component 208 can transmit a PSD modification command to a device that includes a PSD computed by applying the step size to a previous PSD, for example.

Figure 3:
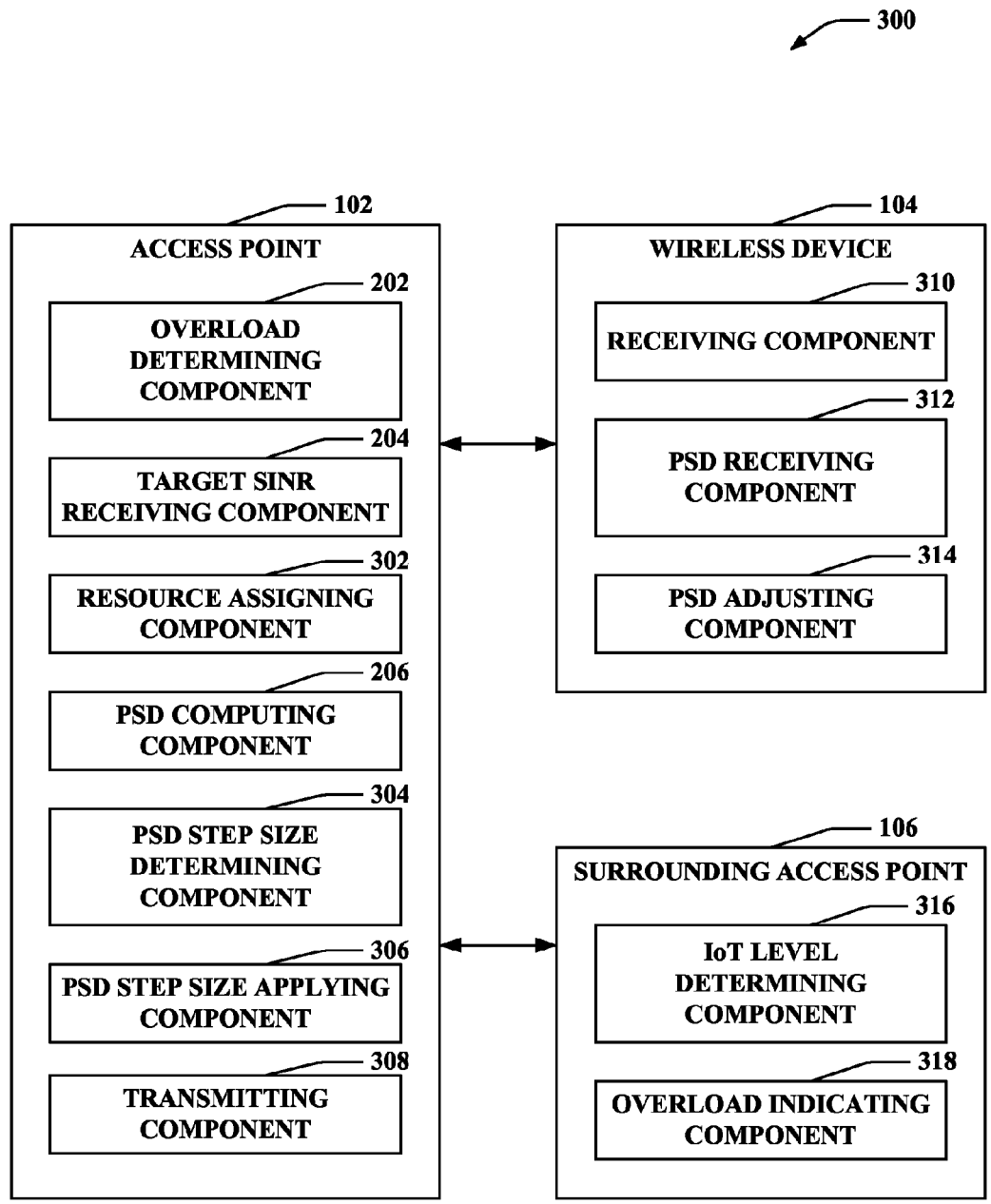
FIG. 3 illustrates an example wireless communication network that effectuates adjusting PSD for a device based at least in part on overload indicators and a target signal-to-interference-and-noise ratio (SINR).

Now referring to FIG. 3, illustrated is a wireless communications system 300 that facilitates controlling PSD of wireless devices to mitigate inter-cell interference in wireless networks. Access point 102 and surrounding access point 106, as described, can be substantially any type of base station or mobile device (including not only independently powered devices, but also modems, for example) that assigns resources for communicating with a wireless network, and/or portion thereof. In addition, wireless device 104 can be a mobile device, another device, or a portion thereof, that receives wireless network access. Moreover, system 300 can be a MIMO system and/or can conform to one or more wireless network system specifications (e.g., EV-DO, 3GPP, 3GPP2, 3GPP LTE, WiMAX, etc.). In addition, the components and functionalities of access point 102 can be present in surrounding access point 106 and vice versa, for example.

Access point 102 can comprise an overload determining component 202 that can detect inter-cell interference at one or more surrounding access points, a target SINR receiving component 204 that can obtain a target SINR for a wireless device, a resource assigning component 302 that can schedule resources for a wireless device, a PSD computing component 206 that can calculate a PSD needed to achieve the target SINR for the wireless device, a PSD step size determining component 304 that can discern a step size based on a previous PSD to achieve the calculated PSD needed to achieve the target SINR, a PSD step size applying component 306 that can compute a new PSD by applying the step size to the previous PSD, and a transmitting component 308 that can communicate the scheduled resources, and/or a related PSD based on the step size, to the wireless device.

Wireless device 104 can include a receiving component 310 that can obtain a resource assignment from an access point, a PSD receiving component 312 that can determine a PSD for the resource assignment based on information received from the access point, and a PSD adjusting component 314 that can modify the PSD by applying the step size. Surrounding access point 106 comprises an IoT level determining component 316 that measures interference in a frequency space in which surrounding access point 106 operates and an overload indicating component 318 that signals to one or more access points whether the IoT is over a threshold level at the surrounding access point 106.

According to an example, IoT level determining component 316 can measure total received interference level and determine whether that level exceeds a threshold level, which can be a parameter according to a configuration, specification, received from a core network, based on previous communications pursuant to one or more threshold levels, etc. Overload indicating component 318 can transmit an indication to access point 102 or one or more disparate access points (e.g., via over-the-air signaling, backhaul communications, through a core wireless network, using one or more devices previously communicating with the surrounding access point 106, and/or the like) that specifies whether the IoT is above the threshold level.

Overload determining component 202 can receive the overload indication from surrounding access point 106 and/or one or more disparate surrounding access points. In one example, overload determining component 202 can discern a wireless device potentially causing the overloading (e.g., based on received downlink pathloss reports related to the wireless device and surrounding access point 106). In one example, overload determining component 202 can determine whether a portion of the wireless network is overloaded based on combining overloading indicators from one or more surrounding access points (e.g., ORing the indicators). Target SINR receiving component 204 can obtain or otherwise compute a target SINR for wireless device 104. As described, the target SINR can be computed based on information regarding the wireless device 104 such as geometry, location, etc., and/or the like, and target SINR selection criteria that provides fair assignment, increased throughput, etc.

Resource assigning component 302 can grant resources to the wireless device 104 for communicating with the access point 102. PSD computing component 206 can determine a PSD necessary to achieve the target SINR for the wireless device 104, which can be based on one or more aspects of the resource grant, such as frequencies and/or time slots related thereto in an OFDM configuration. In this regard, PSD step size determining component 304 can select a step size to apply to a previous PSD assigned to the wireless device 104 by access point 102 to attain the PSD necessary to achieve the target SINR for the wireless device 104. As described, this can be a step size to meet the PSD required to achieve the target SINR or a step size selected from multiple step sizes based on a relationship between the previous PSD and the PSD required to achieve the target SINR.

For example, if overload determining component 202 determines the system is overloaded, PSD step size determining component 304 can assign a small step size to decrease the PSD where the previous PSD is not greater than the PSD required to achieve the target SINR, or a larger step size to decrease the PSD where the previous PSD is greater than that required to achieve the target SINR. If overload determining component 202 determines the system is not overloaded, PSD step size determining component 304 can select a small step size to increase the PSD where the previous PSD is greater than that required to achieve the target SINR, or a larger step size where the previous PSD is not greater than that required to achieve the target SINR, as described. PSD step size applying component 306 can compute a new PSD for the wireless device 104 by applying the step size to the PSD (e.g., by increasing or decreasing according to the step size, as described). The transmitting component 308 can provide the resource grant and/or the new PSD information to the wireless device 104. Receiving component 310 can obtain the resource grant, and PSD receiving component 312 can obtain the related PSD or step size. PSD adjusting component 314 can set the PSD of the wireless device 104 to that specified by access point 102 for transmitting over certain OFDM tones, for example. Where a step size is received, PSD adjusting component 314 can increase or decrease the PSD according to the step size. In either case, inter-cell interference mitigation is provided, as described.

Figure 4:
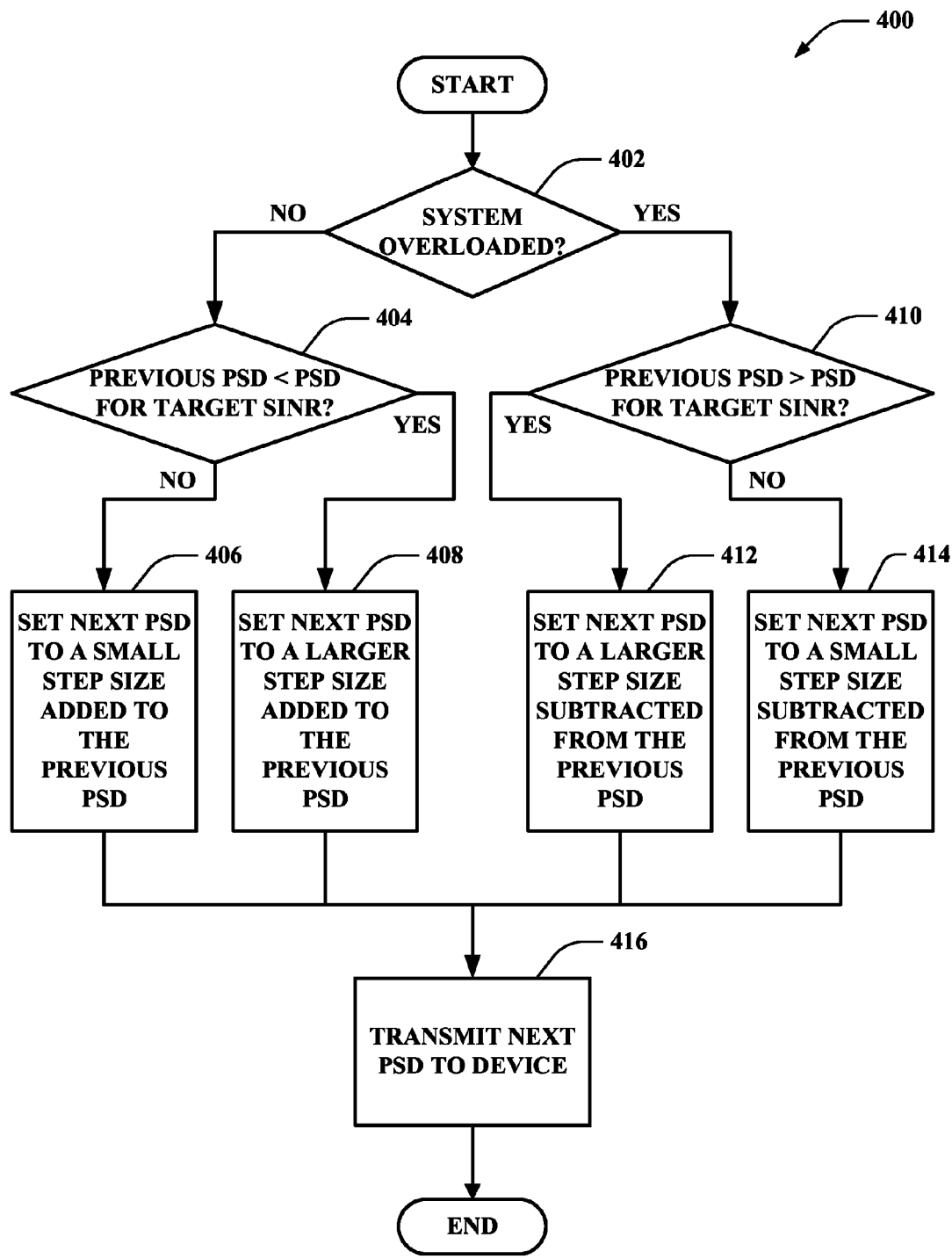
FIG. 4 is a flow diagram of an example methodology that selects a PSD step size for modifying a PSD based on an overload indicator and target SINR.
Figure 5:
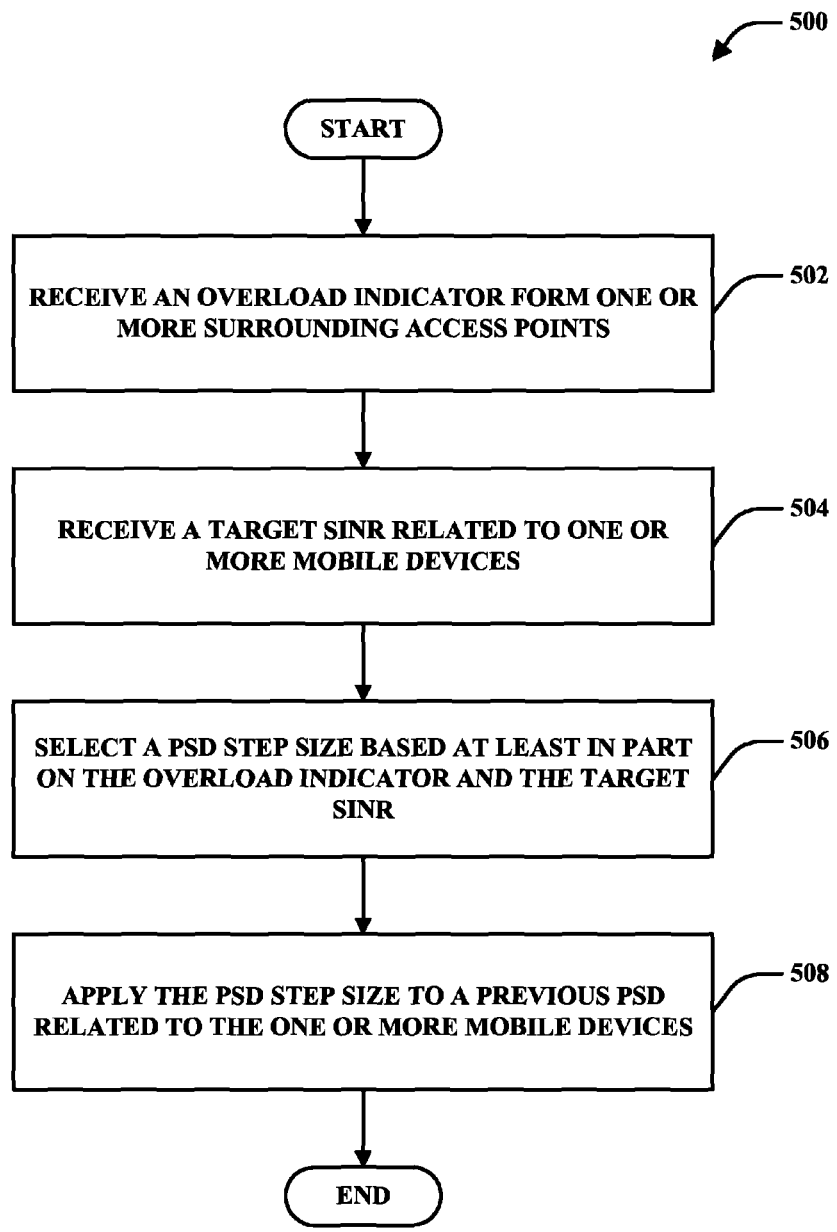
FIG. 5 is a flow diagram of an example methodology that applies a step size to a previous PSD according to an overload indicator and target SINR.

Referring now to FIGS. 4-5, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

With reference to FIG. 4, illustrated is a methodology 400 for determining PSD step sizes for modifying previous PSDs of wireless devices. At 402, it can be determined whether the system is overloaded. As described, this can relate to receiving overload indicators from one or more access points and determining whether a portion of the access points are experiencing IoT over a threshold level. If not, at 404, it can be determined whether a previous PSD is less than a PSD for a target SINR. The PSDs and target SINR can be related to a wireless device to which network access is provided, as described. If the previous PSD is not less than the PSD for the target SINR, at 406, a next PSD can be set to a small step size added to a previous PSD, as described. If the previous PSD is less than the PSD for the target SINR, the next PSD can be set to a larger step size added to the previous PSD at 408. If the system is overloaded at 402, it can be determined, at 410, whether the previous PSD is greater than the PSD for the target SINR. If so, at 412, a next PSD can be set to a larger step size subtracted from the previous PSD. If the previous PSD is not greater than the PSD for target SINR at 410, then a next PSD can be set to a small step size subtracted from the previous PSD at 414. In any case, at 416, the next PSD can be transmitted to the device. This can be part of a resource assignment, in one example.

Turning to FIG. 5, a methodology 500 is illustrated that facilitates modifying a PSD for a mobile device according to a PSD step size determined based on overload indicators and a target SINR. At 502, an overload indicator can be received from one or more surrounding access points. As described, the overload indicator can be received over a backhaul link, over an air interface, from one or more network components, and/or the like. At 504, a target SINR related to one or more mobile devices can be received. The target SINR can be computed, in one example, based on geometry, relative location, etc. of the mobile device, as described. At 506, a PSD step size can be selected based at least in part on the overload indicator and the target SINR. As described, it can be determined whether the system or one or more access point are overloaded based on the overload indicator.

Where the system is overloaded, for example, a small PSD step size can be selected where a previous PSD is not greater than a PSD needed to achieve the target SINR whereas a larger step size can be selected where the PSD is greater than the PSD needed to achieve the target SINR. Similarly, where the system is not overloaded, for example, a small PSD step size can be selected where a previous PSD is not less than the PSD needed to achieve the target SINR whereas a larger PSD step size can be selected where the previous PSD is less than the PSD needed to achieve the target SINR. At 508, the PSD step size can be applied to a previous PSD related to the one or more mobile devices. Thus, where the system is overloaded, for example, the previous PSD can be decreased by the step size, and where the system is not overloaded, the previous PSD can be increased by the step size.

It will be appreciated that, in accordance with one or more aspects described herein, inferences can be made regarding determining devices that are potentially interfering with access points, determining whether a system or access point is overloaded, and/or the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 6:
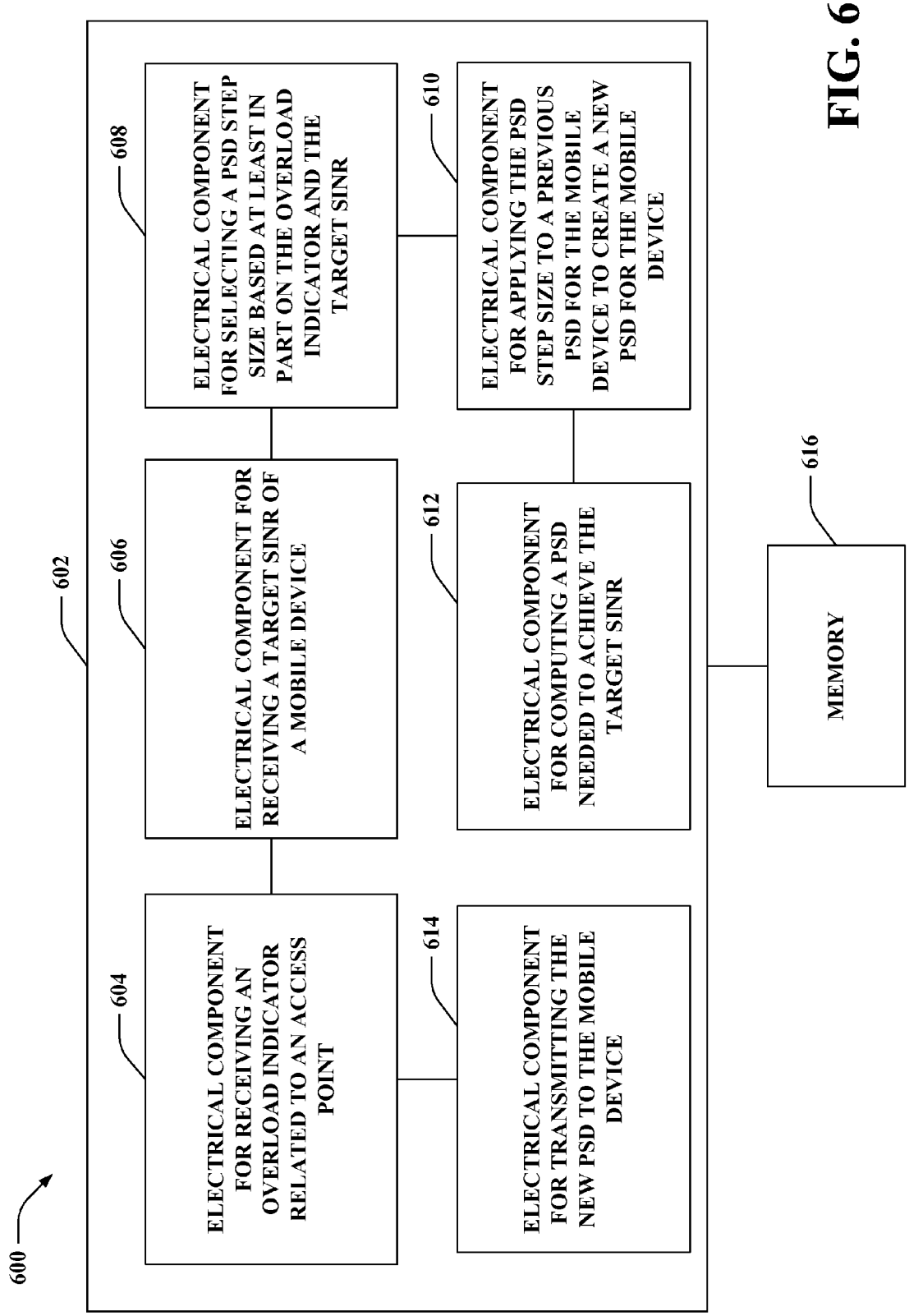
FIG. 6 is a block diagram of an example apparatus that facilitates adjusting PSD for devices based on overload indicators and target SINRs.

With reference to FIG. 6, illustrated is a system 600 that modifies PSD by step sizes determined based on overload indicators and target SINRs. For example, system 600 can reside at least partially within a base station, mobile device, etc. It is to be appreciated that system 600 is represented as including functional blocks, which can be functional blocks that represent functions implemented by a processor, software, or combination thereof (e.g., firmware). System 600 includes a logical grouping 602 of electrical components that can act in conjunction. For instance, logical grouping 602 can include an electrical component for receiving an overload indicator related to an access point 604. As described, this can be received over a backhaul link from the one or more access points, over an air interface, from devices communicating with the one or more access points, and/or the like. Further, logical grouping 602 can comprise an electrical component for receiving a target SINR of a mobile device 606. As described, the target SINR can be computed based on a geometry, relative location, and/or the like of the mobile device. In another example, the target SINR can be received from the mobile device or one or more disparate devices.

Moreover, logical grouping 602 includes an electrical component for selecting a PSD step size based at least in part on the overload indicator and the target SINR 608. As described, electrical component 604 can select the step size based at least in part on comparing a PSD needed to achieve the target SINR to a previous PSD assigned to the mobile device. If, for example, the overload indicator specifies that the access point is overloaded, electrical component 604 can select a small step size where a previous PSD assigned to the mobile device is not greater than a PSD to achieve the target SINR, or a larger step size otherwise. Similarly, as described, if the overload indicator specifies that the access point is not overloaded, electrical component 604 can select a small step size where the previously assigned PSD is not less than the PSD required to achieve the target SINR, or a larger step size otherwise. Furthermore, logical grouping 602 can also include an electrical component for applying the PSD step size to a previous PSD for the mobile device to create a new PSD for the mobile device 610.

As described, where the access point is overloaded, electrical component 610 can decrease the previous PSD by the step size, and vice versa where the access point is not overloaded. In addition, logical grouping 602 can include an electrical component for computing a PSD needed to achieve the target SINR 612. As described, this can be based on the geometry, relative location, etc. of the mobile device. Further, logical grouping 602 can include an electrical component for transmitting the new PSD to the mobile device 614. Additionally, system 600 can include a memory 616 that retains instructions for executing functions associated with electrical components 604, 606, 608, 610, 612, and 614. While shown as being external to memory 616, it is to be understood that one or more of electrical components 604, 606, 608, 610, 612, and 614 can exist within memory 616.

Figure 7:
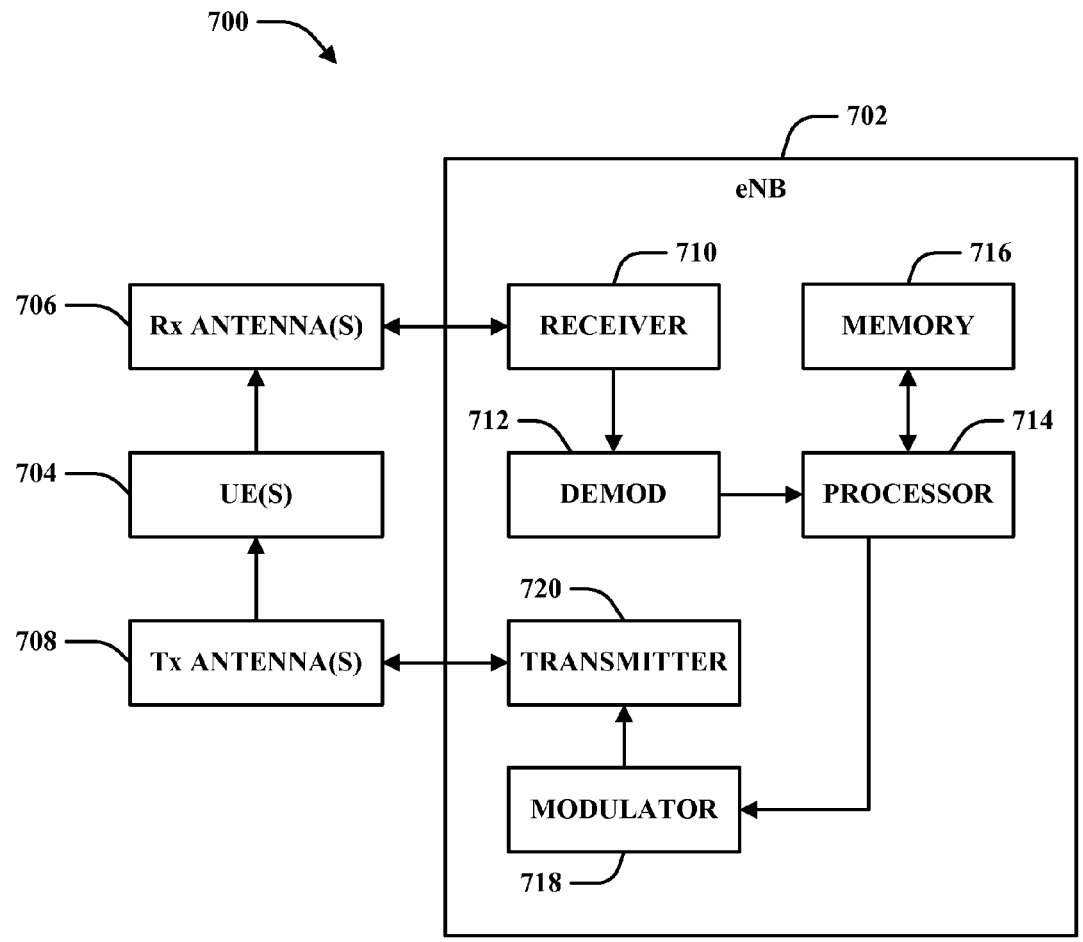
FIGS. 7-8 are block diagrams of example wireless communication devices that can be utilized to implement various aspects of the functionality described herein.

FIG. 7 is a block diagram of a system 700 that can be utilized to implement various aspects of the functionality described herein. In one example, system 700 includes a base station or eNB 702. As illustrated, eNB 702 can receive signal(s) from one or more UEs 704 via one or more receive (Rx) antennas 706 and transmit to the one or more UEs 704 via one or more transmit (Tx) antennas 708. Additionally, eNB 702 can comprise a receiver 710 that receives information from receive antenna(s) 706. In one example, the receiver 710 can be operatively associated with a demodulator (Demod) 712 that demodulates received information. Demodulated symbols can then be analyzed by a processor 714. Processor 714 can be coupled to memory 716, which can store information related to code clusters, access terminal assignments, lookup tables related thereto, unique scrambling sequences, and/or other suitable types of information. In one example, eNB 702 can employ processor 714 to perform methodologies 400, 500, and/or other similar and appropriate methodologies. eNB 702 can also include a modulator 718 that can multiplex a signal for transmission by a transmitter 720 through transmit antenna(s) 708.

Figure 8:
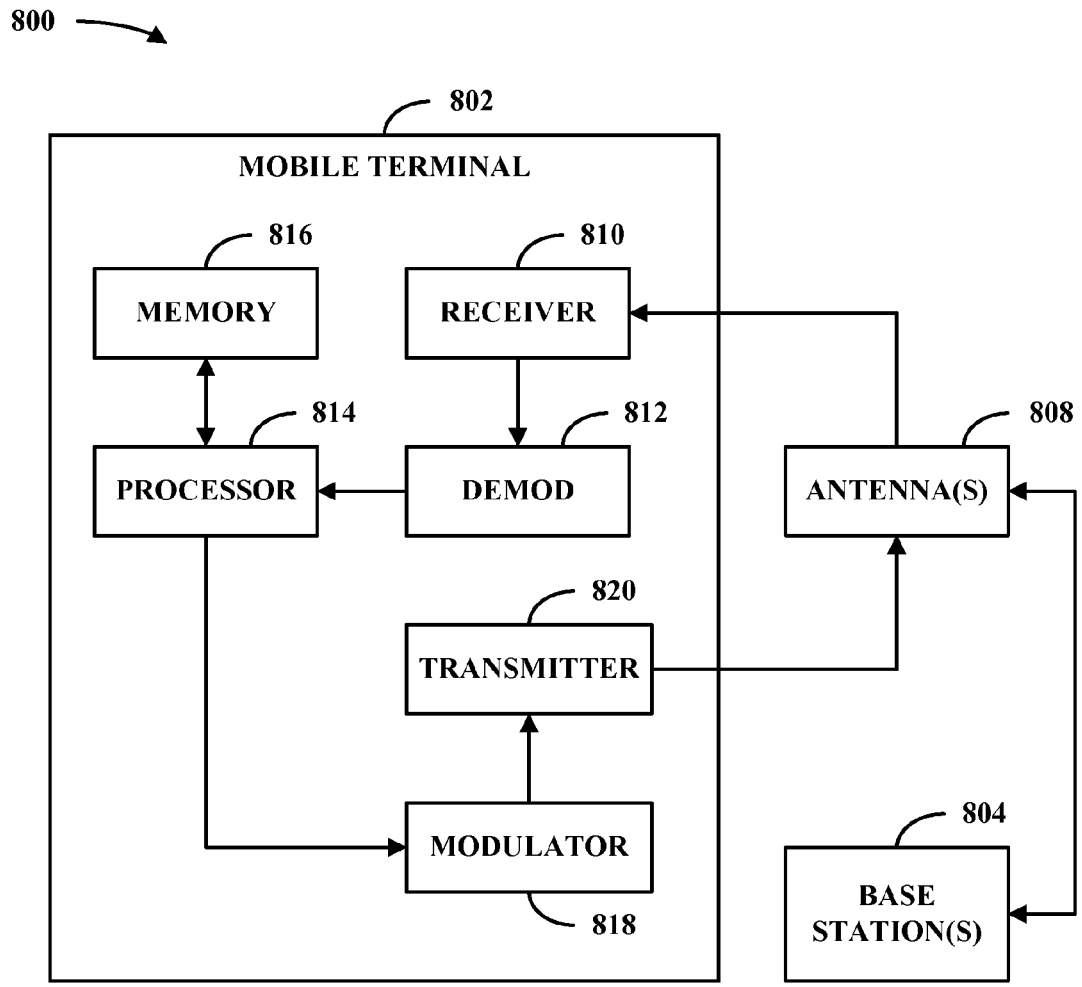

FIG. 8 is a block diagram of another system 800 that can be utilized to implement various aspects of the functionality described herein. In one example, system 800 includes a mobile terminal 802. As illustrated, mobile terminal 802 can receive signal(s) from one or more base stations 804 and transmit to the one or more base stations 804 via one or more antennas 808. Additionally, mobile terminal 802 can comprise a receiver 810 that receives information from antenna(s) 808. In one example, receiver 810 can be operatively associated with a demodulator (Demod) 812 that demodulates received information. Demodulated symbols can then be analyzed by a processor 814. Processor 814 can be coupled to memory 816, which can store data and/or program codes related to mobile terminal 802. Additionally, mobile terminal 802 can employ processor 814 to perform methodologies 400, 500, and/or other similar and appropriate methodologies. Mobile terminal 802 can also employ one or more components described in previous figures to effectuate the described functionality; in one example, the components can be implemented by the processor 814. Mobile terminal 802 can also include a modulator 818 that can multiplex a signal for transmission by a transmitter 820 through antenna(s) 808.

Figure 9:
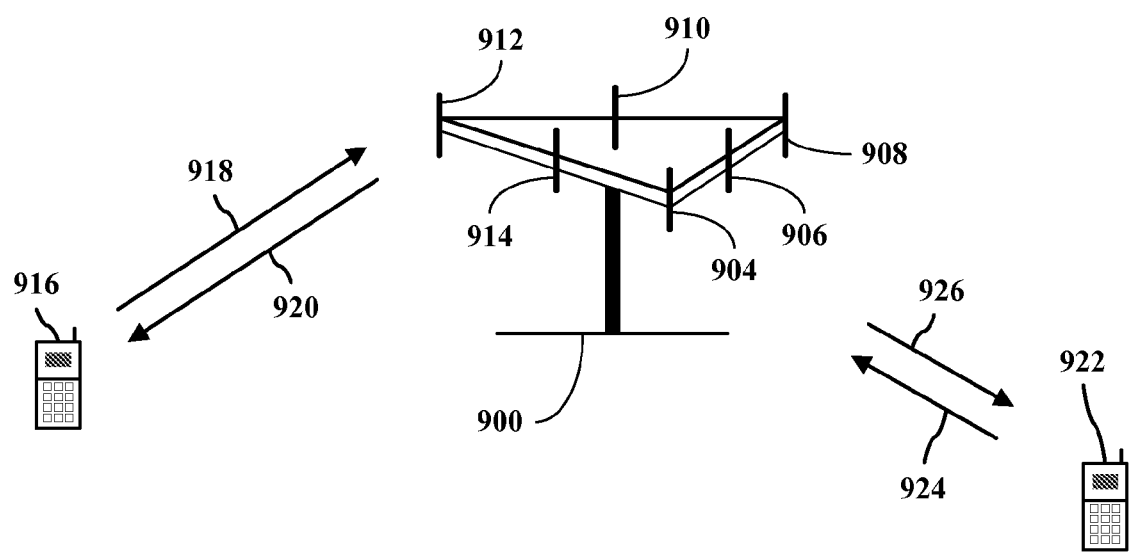
FIG. 9 illustrates an example wireless multiple-access communication system in accordance with various aspects set forth herein.

Referring now to FIG. 9, an illustration of a wireless multiple-access communication system is provided in accordance with various aspects. In one example, an access point 900 (AP) includes multiple antenna groups. As illustrated in FIG. 9, one antenna group can include antennas 904 and 906, another can include antennas 908 and 910, and another can include antennas 912 and 914. While only two antennas are shown in FIG. 9 for each antenna group, it should be appreciated that more or fewer antennas may be utilized for each antenna group. In another example, an access terminal 916 can be in communication with antennas 912 and 914, where antennas 912 and 914 transmit information to access terminal 916 over forward link 920 and receive information from access terminal 916 over reverse link 918. Additionally and/or alternatively, access terminal 922 can be in communication with antennas 906 and 908, where antennas 906 and 908 transmit information to access terminal 922 over forward link 926 and receive information from access terminal 922 over reverse link 924. In a frequency division duplex system, communication links 918, 920, 924 and 926 can use different frequency for communication. For example, forward link 920 may use a different frequency then that used by reverse link 918.

Each group of antennas and/or the area in which they are designed to communicate can be referred to as a sector of the access point. In accordance with one aspect, antenna groups can be designed to communicate to access terminals in a sector of areas covered by access point 900. In communication over forward links 920 and 926, the transmitting antennas of access point 900 can utilize beamforming in order to improve the signal-to-noise ratio of forward links for the different access terminals 916 and 922. Also, an access point using beamforming to transmit to access terminals scattered randomly through its coverage causes less interference to access terminals in neighboring cells than an access point transmitting through a single antenna to all its access terminals.

An access point, e.g., access point 900, can be a fixed station used for communicating with terminals and can also be referred to as a base station, an eNB, an access network, and/or other suitable terminology. In addition, an access terminal, e.g., an access terminal 916 or 922, can also be referred to as a mobile terminal, user equipment, a wireless communication device, a terminal, a wireless terminal, and/or other appropriate terminology.

Figure 10:
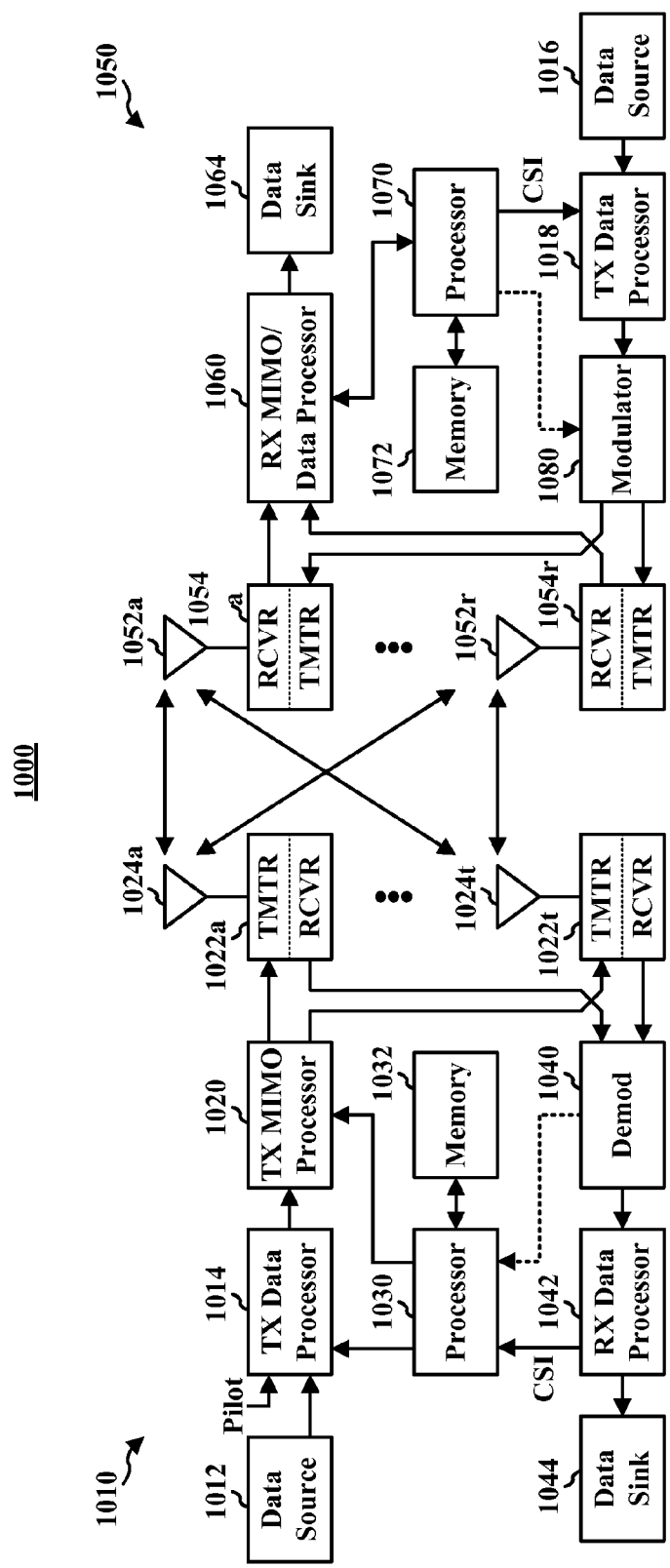
FIG. 10 is a block diagram illustrating an example wireless communication system in which various aspects described herein can function.

Referring now to FIG. 10, a block diagram illustrating an example wireless communication system 1000 in which various aspects described herein can function is provided. In one example, system 1000 is a multiple-input multiple-output (MIMO) system that includes a transmitter system 1010 and a receiver system 1050. It should be appreciated, however, that transmitter system 1010 and/or receiver system 1050 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1010 and/or receiver system 1050 described herein could be utilized in connection with a single output to single input antenna system.

In accordance with one aspect, traffic data for a number of data streams are provided at transmitter system 1010 from a data source 1012 to a transmit (TX) data processor 1014. In one example, each data stream can then be transmitted via a respective transmit antenna 1024. Additionally, TX data processor 1014 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1050 to estimate channel response. Back at transmitter system 1010, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1030.

Next, modulation symbols for all data streams can be provided to a TX processor 1020, which can further process the modulation symbols (e.g., for OFDM). TX MIMO processor 1020 can then provides $N_T$ modulation symbol streams to $N_T$ transceivers 1022a through 1022t. In one example, each transceiver 1022 can receive and process a respective symbol stream to provide one or more analog signals. Each transceiver 1022 can then further condition (e.g., amplify, filter, and upconvert) the analog signals to provide a modulated signal suitable for transmission over a MIMO channel. Accordingly, $N_T$ modulated signals from transceivers 1022a through 1022t can then be transmitted from $N_T$ antennas 1024a through 1024t, respectively.

In accordance with another aspect, the transmitted modulated signals can be received at receiver system 1050 by $N_R$ antennas 1052a through 1052r. The received signal from each antenna 1052 can then be provided to respective transceivers 1054. In one example, each transceiver 1054 can condition (e.g., filter, amplify, and downconvert) a respective received signal, digitize the conditioned signal to provide samples, and then processes the samples to provide a corresponding "received" symbol stream. An RX MIMO/data processor 1060 can then receive and process the $N_R$ received symbol streams from $N_R$ transceivers 1054 based on a particular receiver processing technique to provide $N_T$ "detected" symbol streams. In one example, each detected symbol stream can include symbols that are estimates of the modulation symbols transmitted for the corresponding data stream. RX processor 1060 can then process each symbol stream at least in part by demodulating, deinterleaving, and decoding each detected symbol stream to recover traffic data for a corresponding data stream. Thus, the processing by RX processor 1060 can be complementary to that performed by TX MIMO processor 1020 and TX data processor 1016 at transmitter system 1010. RX processor 1060 can additionally provide processed symbol streams to a data sink 1064.

In accordance with one aspect, the channel response estimate generated by RX processor 1060 can be used to perform space/time processing at the receiver, adjust power levels, change modulation rates or schemes, and/or other appropriate actions. Additionally, RX processor 1060 can further estimate channel characteristics such as, for example, signal-to-noise-and-interference ratios (SNRs) of the detected symbol streams. RX processor 1060 can then provide estimated channel characteristics to a processor 1070. In one example, RX processor 1060 and/or processor 1070 can further derive an estimate of the "operating" SNR for the system. Processor 1070 can then provide channel state information (CSI), which can comprise information regarding the communication link and/or the received data stream. This information can include, for example, the operating SNR. The CSI can then be processed by a TX data processor 1018, modulated by a modulator 1080, conditioned by transceivers 1054a through 1054r, and transmitted back to transmitter system 1010. In addition, a data source 1016 at receiver system 1050 can provide additional data to be processed by TX data processor 1018.

Back at transmitter system 1010, the modulated signals from receiver system 1050 can then be received by antennas 1024, conditioned by transceivers 1022, demodulated by a demodulator 1040, and processed by a RX data processor 1042 to recover the CSI reported by receiver system 1050. In one example, the reported CSI can then be provided to processor 1030 and used to determine data rates as well as coding and modulation schemes to be used for one or more data streams. The determined coding and modulation schemes can then be provided to transceivers 1022 for quantization and/or use in later transmissions to receiver system 1050. Additionally and/or alternatively, the reported CSI can be used by processor 1030 to generate various controls for TX data processor 1014 and TX MIMO processor 1020. In another example, CSI and/or other information processed by RX data processor 1042 can be provided to a data sink 1044.

In one example, processor 1030 at transmitter system 1010 and processor 1070 at receiver system 1050 direct operation at their respective systems. Additionally, memory 1032 at transmitter system 1010 and memory 1072 at receiver system 1050 can provide storage for program codes and data used by processors 1030 and 1070, respectively. Further, at receiver system 1050, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method of computing power spectrum density (PSD) information at an access point, the method comprising:
   receiving an overload indicator over a backhaul between the access point and at least one surrounding access point;
   determining a target signal-to-interference-and-noise ratio (SINR) associated with a mobile device;
   at the access point, selecting a power spectrum density (PSD) step size based at least in part on the overload indicator and the target SINR;
   at the access point, computing a new PSD by applying the PSD step size to a previous PSD associated with the mobile device; and
   transmitting the new PSD from the access point to the mobile device.

2. The method of claim 1, wherein the selecting the PSD step size includes selecting from two possible PSD step sizes.

3. The method of claim 2, further comprising determining a PSD needed to achieve the target SINR for the mobile device, wherein the selecting the PSD step size includes selecting one of the two possible PSD step sizes based at least in part on a difference between a PSD previously assigned to the mobile device and the PSD needed to achieve the target SINR for the mobile device.

4. The method of claim 3, wherein the overload indicator specifies that the at least one surrounding access point are overloaded, the selecting the PSD step size includes selecting a smaller PSD step size of the two possible PSD step sizes where the PSD previously assigned to the mobile device is less than the PSD needed to achieve the target SINR for the mobile device, and the applying the PSD step size includes subtracting the PSD step size from the PSD previously assigned to the mobile device.

5. The method of claim 3, wherein the overload indicator specifies that the at least surrounding access points are not overloaded, the selecting the PSD step size includes selecting a smaller PSD step size of the two possible PSD step sizes where the PSD previously assigned to the mobile device is greater than the PSD needed to achieve the target SINR for the mobile device, and the applying the PSD step size includes adding the PSD step size to the PSD previously assigned to the mobile device.

6. The method of claim 1, wherein the determining the target SINR associated with the mobile device includes computing the target SINR based at least in part on a geometry or relative location of the mobile device.

7. A wireless communications apparatus, comprising:
   at least one processor configured to:
      receive an overload indicator over a backhaul link from at least one access point;
      compute a power spectrum density (PSD) to achieve a target signal-to-interference-and-noise ratio (SINR) associated with a mobile device;
      select a PSD step size based at least in part on the overload indicator and comparing the PSD to a previous PSD assigned to the one or more mobile devices; and
      apply the PSD step size to the previous PSD to create a new PSD for the mobile device;
      transmit the new PSD to the mobile device; and
   a memory coupled to the at least one processor.

8. The wireless communications apparatus of claim 7, wherein the at least one processor selects the PSD step size from two PSD step sizes.

9. The wireless communications apparatus of claim 8, wherein the at least one processor is configured to select a smaller of the two PSD step sizes where the overload indicator specifies that the at least access point are overloaded and the previous PSD is less than the PSD to achieve the target SINR, and the at least one processor is configured to apply the PSD step size to the previous PSD by subtracting the PSD step size from the previous PSD.

10. The wireless communications apparatus of claim 8, wherein the at least one processor is configured to select a smaller of the two PSD step sizes where the overload indicator specifies that the at least one access point are not overloaded and the previous PSD is greater than the PSD to achieve the target SINR, and the at least one processor is configured to apply the PSD step size to the previous PSD by adding the PSD step size to the previous PSD.

11. The wireless communications apparatus of claim 7, wherein the at least one processor is further configured to determine the target SINR associated with the mobile device based at least in part on a geometry or a relative location of the mobile device.

12. An apparatus, comprising:
- means for receiving an overload indicator at an access point over a backhaul link from at least one surrounding access point;
- means for determining a target signal-to-interference-and-noise ratio (SINR) of a mobile device;
- means for selecting a power spectrum density (PSD) step size at the access point based at least in part on the overload indicator and the target SINR;
- means for applying the PSD step size at the access point to a previous PSD for the mobile device to create a new PSD for the mobile device; and
- means for transmitting the new PSD to the mobile device.

13. The apparatus of claim 12, wherein the means for selecting selects the PSD step size from two possible PSD step sizes.

14. The apparatus of claim 13, further comprising means for computing a PSD needed to achieve the target SINR, wherein the means for selecting selects the PSD step size from the two possible PSD step sizes based at least in part on comparing the PSD needed to achieve the target SINR to the previous PSD for the mobile device.

15. The apparatus of claim 14, wherein the means for selecting selects a larger of the two possible PSD step sizes where the overload indicator specifies that the access point is overloaded and the previous PSD for the mobile device is greater than the PSD needed to achieve the target SINR, and the means for applying the PSD step size subtracts the PSD step size from the previous PSD for the mobile device.

16. The apparatus of claim 14, wherein the means for selecting selects a larger of the two possible PSD step sizes where the overload indicator specifies that the access point is not overloaded and the previous PSD for the mobile device is less than the PSD needed to achieve the target SINR, and the means for applying the PSD step size adds the PSD step size to the previous PSD for the mobile device.

17. The apparatus of claim 12, wherein the means for receiving the target SINR computes the target SINR from a geometry or relative location of the mobile device.

18. A computer program product, comprising:
- a non-transitory computer-readable medium comprising:
  - code for causing at least one computer to receive an overload indicator at an access point over a backhaul link from at least one surrounding access point;
  - code for causing the at least one computer at the access point to determine a target signal-to-interference-and-noise ratio (SINR) associated with a mobile device;
  - code for causing the at least one computer to select a power spectrum density (PSD) step size based at least in part on the overload indicator and the target SINR;
  - code for causing the at least one computer to compute a new PSD by applying the PSD step size to a previous PSD associated with the mobile device; and
  - code for causing the at least one computer to transmit the new PSD to the mobile device.

19. The computer program product of claim 18, wherein the code for causing the at least one computer to select a PSD step size selects the PSD step size from two possible PSD step sizes.

20. The computer program product of claim 19, wherein the non-transitory computer-readable medium further comprises code for causing the at least one computer to determine a PSD needed to achieve the target SINR for the mobile device, wherein the code for causing the at least one computer to select the PSD step size selects one of the two possible PSD step sizes based at least in part on a difference between a PSD previously assigned to the mobile device and the PSD needed to achieve the target SINR for the mobile device.

21. The computer program product of claim 20, wherein the overload indicator specifies that the at least one surrounding access point are overloaded, the code for causing the at least one computer to select the PSD step size selects a smaller PSD step size of the two possible PSD step sizes where the PSD previously assigned to the mobile device is less than the PSD needed to achieve the target SINR for the mobile device, and the code for causing the at least one computer to apply the PSD step size subtracts the PSD step size from the PSD previously assigned to the mobile device.

22. The computer program product of claim 20, wherein the overload indicator specifies that the at least one surrounding access point are not overloaded, the code for causing the at least one computer to select the PSD step size selects a smaller PSD step size of the two possible PSD step sizes where the PSD previously assigned to the mobile device is greater than the PSD needed to achieve the target SINR for the mobile device, and the code for causing the at least one computer to apply the PSD step size adds the PSD step size to the PSD previously assigned to the mobile device.

23. The computer program product of claim 18, wherein the code for causing the at least one computer to receive the target SINR computes the target SINR based at least in part on a geometry or relative location of the mobile device.

24. An apparatus, comprising:
- an overload determining component at an access point that receives an overload indicator over a backhaul link from a surrounding access point;
- a target signal-to-interference-and-noise ratio (SINR) receiving component configured to determine a target SINR of a mobile device;
- a power spectrum density (PSD) step size selecting component at the access point configured to determine a PSD step size based at least in part on the overload indicator and the target SINR;
- a PSD step size applying component at the access point configured to create a new PSD for the mobile device by applying the PSD step size to a previous PSD for the mobile device; and
- a transmit component configured to transmit the new PSD to the mobile device.

25. The apparatus of claim 24, wherein the PSD step size selecting component is configured to determine the PSD step size from two possible PSD step sizes.

26. The apparatus of claim 25, further comprising a PSD computing component configured to calculate a PSD needed to achieve the target SINR, wherein the PSD step size selecting component is configured to determine the PSD step size from the two possible PSD step sizes based at least in part on comparing the PSD needed to achieve the target SINR to the previous PSD for the mobile device.

27. The apparatus of claim 26, wherein the PSD step size selecting component is configured to determine a larger of the two possible PSD step sizes where the overload indicator specifies that the access point is overloaded and the previous PSD for the mobile device is greater than the PSD needed to achieve the target SINR, and the PSD step size applying component subtracts is configured to substract the PSD step size from the previous PSD for the mobile device.

28. The apparatus of claim 26, wherein the PSD step size selecting component is configured to determine a larger of the two possible PSD step sizes where the overload indicator specifies that the access point is not overloaded and the previous PSD for the mobile device is less than the PSD needed to achieve the target SINR, and the PSD step size applying component is configured to add the PSD step size to the previous PSD for the mobile device.

29. The apparatus of claim 24, wherein the target SINR receiving component is configured to compute the target SINR from a geometry or relative location of the mobile device.

* * * * *